US010985962B1

(12) United States Patent
Sahin et al.

(10) Patent No.: US 10,985,962 B1
(45) Date of Patent: Apr. 20, 2021

(54) METHOD AND SYSTEM FOR WIDEBAND INDEX MODULATION BASED ON CHIRP SIGNALS

(71) Applicant: University of South Carolina, Columbia, SC (US)

(72) Inventors: Alphan Sahin, Columbia, SC (US); Safi Shams Muhtasimu Hoque, West Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 16/931,097

(22) Filed: Jul. 16, 2020

(51) Int. Cl.
*H04L 27/26* (2006.01)
*H04B 1/69* (2011.01)

(52) U.S. Cl.
CPC .......... *H04L 27/2627* (2013.01); *H04B 1/69* (2013.01); *H04L 27/2605* (2013.01); *H04B 2001/6912* (2013.01)

(58) Field of Classification Search
CPC ............. H04L 27/2627; H04L 27/2628; H04L 27/263; H04L 27/2631–2636; H04L 27/2605; H04L 27/2607; H04L 27/10; H04L 27/103; H04B 1/69; H04B 2001/6912
See application file for complete search history.

(56) References Cited

U.S. PATENT DOCUMENTS

| | | | | | |
|---|---|---|---|---|---|
| 4,782,284 | A * | 11/1988 | Adams | ..................... | G01H 7/00 324/76.15 |
| 8,249,129 | B2 * | 8/2012 | Fudge | ................. | G01S 13/0209 375/135 |
| 8,374,161 | B2 * | 2/2013 | Malladi | ................... | H04L 1/001 370/343 |
| 8,406,275 | B2 * | 3/2013 | Sforza | ..................... | H04L 27/12 375/139 |
| 8,526,483 | B2 * | 9/2013 | Choi | ..................... | H04L 1/0003 375/139 |
| 8,532,084 | B2 * | 9/2013 | Popovic | .............. | H04L 27/2613 370/350 |

(Continued)

OTHER PUBLICATIONS

Berardinelli, Gilberto. "Generalized DFT-s-OFDM waveforms without cyclic prefix." Ieee Access 6 (2017): 4677-4689. (Year: 2017).*

*Primary Examiner* — James M Perez
(74) *Attorney, Agent, or Firm* — Burr & Forman LLP; Jeffrey H. Kamenetsky

(57) ABSTRACT

A method, performed at a transmitter, for increasing communication link distance and reliability in a communication channel or dual function radar communication system, is provided. The method includes calculating an information sequence, indices of non-zero elements and corresponding values in the sequence indicating information bits to be transmitted; shaping a Discrete Fourier Transform (DFT) of the information sequence by special frequency-domain spectral shaping (FDSS) in the frequency domain to form a frequency-domain representation of chirp signals; mapping the shaped sequence to orthogonal frequency division multiplexing (OFDM) subcarriers; performing an inverse DFT of the mapped shaped sequence to form chirp signals to be transmitted; and transmitting the chirp signals with a cycle prefix (CP).

20 Claims, 12 Drawing Sheets

(56) References Cited

U.S. PATENT DOCUMENTS

| | | | | |
|---|---|---|---|---|
| 8,718,117 B2* | 5/2014 | Hiscock | H04B 1/713 | 375/139 |
| 8,891,430 B1* | 11/2014 | Sahin | H04L 5/0007 | 370/312 |
| 9,083,483 B1* | 7/2015 | Rakib | H04J 11/0063 | |
| 9,319,098 B2* | 4/2016 | Hiscock | H04B 1/713 | |
| 9,319,253 B2* | 4/2016 | Sahin | H04L 25/0384 | |
| 9,485,761 B2* | 11/2016 | Malladi | H04L 1/1671 | |
| 9,729,250 B2* | 8/2017 | Yu | H04L 27/223 | |
| 9,780,985 B1* | 10/2017 | Tom | H04L 5/0007 | |
| 10,079,700 B1* | 9/2018 | Sahin | H04L 27/2634 | |
| 10,801,998 B2* | 10/2020 | Giurgiutiu | G01N 29/2437 | |
| 2007/0041311 A1* | 2/2007 | Baum | H04L 5/0048 | 370/208 |
| 2007/0165588 A1* | 7/2007 | McCoy | H04L 27/2672 | 370/344 |
| 2007/0183386 A1* | 8/2007 | Muharemovic | H04L 5/023 | 370/344 |
| 2008/0090528 A1* | 4/2008 | Malladi | H04L 1/0004 | 455/70 |
| 2008/0288184 A1* | 11/2008 | Giurgiutiu | G01N 27/9046 | 702/35 |
| 2009/0201825 A1* | 8/2009 | Shen | H04L 1/0029 | 370/252 |
| 2013/0129017 A1* | 5/2013 | Sahin | H04L 27/2634 | 375/296 |
| 2013/0223360 A1* | 8/2013 | Tabet | G06F 17/141 | 370/329 |
| 2018/0139081 A1* | 5/2018 | Guvenkaya | H04L 27/2618 | |
| 2018/0324005 A1* | 11/2018 | Kim | H04L 25/03834 | |
| 2019/0033263 A1* | 1/2019 | Giurgiutiu | G01N 29/46 | |
| 2019/0379422 A1* | 12/2019 | Hadani | H04L 27/2695 | |
| 2019/0386717 A1* | 12/2019 | Shattil | H04B 7/024 | |
| 2020/0033442 A1* | 1/2020 | Gulati | G01S 7/288 | |
| 2020/0052947 A1* | 2/2020 | Sahin | H04W 72/0453 | |
| 2020/0145266 A1* | 5/2020 | Yang | H04J 13/0055 | |
| 2020/0204421 A1* | 6/2020 | Levinbook | H04L 5/0007 | |
| 2020/0244501 A1* | 7/2020 | Shattil | H04L 25/03834 | |
| 2020/0259693 A1* | 8/2020 | Baldemair | H04L 5/0048 | |
| 2020/0351070 A1* | 11/2020 | Chou | H04L 5/10 | |

* cited by examiner

METHOD AND SYSTEM FOR WIDEBAND INDEX MODULATION BASED ON CHIRP SIGNALS

TECHNICAL FIELD

This disclosure generally relates to communication systems and methods and, more particularly, to a system and method for utilizing chirp signals in communication applications.

BACKGROUND

In certain applications, chirp signals can provide robustness against distortions due to the non-linear components in a radio frequency (RF) chain, such as, for example, a non-linear power amplifier (PA). Chirp signals can sweep a large frequency spectrum while still being constant-envelope signals, and can provide good aperiodic autocorrelation (APAC) properties. Chirp signals are useful in such applications as communications systems, radar systems, commercial low-power communications systems such as Internet-of-Things (IoT) networks and short-range wireless sensing systems.

However, one of the challenges associated with using multiple chirp signals for communications is that the peak-to-mean-envelope power ratio (PMEPR) can be relatively high when multiple chirps are transmitted simultaneously. For a practical system, assuring that PMEPR is less than a certain threshold can increase link reliability and link distance. However, while limiting the number of simultaneously transmitted chirps can achieve increased link reliability and distance, this results in increasing spectral efficiency which is also problematic.

Therefore, what is needed is a system and methodology that addresses the aforementioned problems. The present disclosure addresses this need.

SUMMARY

In one aspect of the present disclosure, a method, performed at a transmitter, for increasing communication link distance and reliability in a communication channel or dual function radar communication system, is provided. The method includes calculating an information sequence, indices of non-zero elements and corresponding values in the sequence indicating information bits to be transmitted; shaping a Discrete Fourier Transform (DFT) of the information sequence by special frequency-domain spectral shaping (FDSS) in the frequency domain to form a frequency-domain representation of chirp signals; mapping the shaped sequence to orthogonal frequency division multiplexing (OFDM) subcarriers; performing an inverse DFT of the mapped shaped sequence to form chirp signals to be transmitted; and transmitting the chirp signals with a cycle prefix (CP).

In one embodiment of this aspect, the method further includes generating a complementary sequence (CS) by linearly combining frequency responses of two constant-amplitude chirp signals. In another embodiment, transmitting the chirp signals includes constructing at least one of a Golay complementary pair and a CS based on the shaped DFT of the information sequence. In another embodiment, transmitting l number of chirp signals further includes identifying $S=[\log_2(\binom{M}{l} \times H^l)]$ information bits, where H represents an integer power-of-two, and M represents a number of circularly-shifted chirp signals; mapping $l \log_2$ of H of the identified information bits to $\{s_1, s_2, s_3, \ldots, s_l\}$, where $s_1, s_2, s_3, \ldots, s_l \in \mathcal{S}_{PSK,H}$; utilizing the remaining information bits to choose a set of indices $\{m_1, m_2, m_3, \ldots, m_l\}$, where $m_1, m_2, m_3, \ldots, m_l \in \{0, 1, \ldots M-1\}$ and $m_1 < m_2 < m_3 < \ldots < m_l$; generating modulation symbols as $d_{m_1} = s_1$, $d_{m_2} = s_2$, $d_{m_3} = s_3$, $\ldots$, $d_{m_l} = s_l$ and $d_{i|i \in \{0, 1, \ldots M-1\} i \neq m_1, m_2, m_3, \ldots, m_l} = 0$; increasing a spectral efficiency (SE) of the chirp signals as $\rho = ([\log_2(\binom{M}{l} \times H^l)])/M$ bit/second/Hz; and maintaining a peak-to-mean-envelope-power ratio (PMEPR) of the chirp signals to be less than or equal to 1. In another embodiment, l=2.

In another embodiment, the method further includes implementing a low complexity maximum-likelihood (ML) detector by evaluating $C_{i,k} = \mathcal{R}\{d_i e^{-j2\pi k/H}\}$ for i=0, 1, ... M−1 and k=0, 1, ... H; and choosing two different indices for i and the corresponding k's that maximize $C_{i,k}$. In another embodiment, utilizing the remaining information bits to choose the set $\{m, n\}$, further includes constructing a bijection function from integers via a combinatorial number system of degree 2.

In another embodiment, identifying $S=[\log_2(\binom{M}{2} \times H^2)]$ information bits includes using a random set of integers without changing the cardinality. In another embodiment, the FDSS may be chosen among Bessel functions or Fresnel integers. In another embodiment, the method further includes performing multiple DFT-spread operations to increase the spectral efficiency (SE) of the chirp signals.

In another aspect of the present disclosure, a transmitter implemented by processing circuitry, the processing circuitry comprising a processor and a memory containing instructions executable by the processor, is provided, where the processor is configured to calculate an information sequence, indices of non-zero elements and corresponding values in the sequence indicating information bits to be transmitted; shape a DFT of the information sequence by FDSS in the frequency domain to form a frequency-domain representation of chirp signals; map the shaped sequence to OFDM subcarriers; and perform an inverse DFT of the mapped shaped sequence to form chirp signals to be transmitted. The transmitter is further configured to transmit the chirp signals with a CP.

In one embodiment of this aspect, the processor is further configured to generate a CS by linearly combining frequency responses of two constant-amplitude chirp signals. In another embodiment, transmitting the chirp signals includes constructing, by the processor, at least one of a Golay complementary pair and a CS based on the shaped DFT of the information sequence.

In another embodiment, transmitting l number of chirp signals further includes identifying $S=[\log_2(\binom{M}{l} \times H^l)]$ information bits, where H represents an integer power-of-two, and M represents a number of circularly-shifted chirp signals; mapping $l \log_2$ of H of the identified information bits to $\{s_1, s_2, s_3, \ldots, s_l\}$, where $s_1, s_2, s_3, \ldots, s_l \in \mathcal{S}_{PSK,H}$; utilizing the remaining information bits to choose a set of indices $\{m_1, m_2, m_3, \ldots, m_l\}$, where $m_1, m_2, m_3, \ldots, m_l \in \{0, 1, \ldots M-1\}$ and $m_1 < m_2 < m_3 < \ldots < m_l$; generating modulation symbols as $d_{m_1} = s_1$, $d_{m_2} = s_2$, $d_{m_3} = s_3$, $\ldots$, $d_{m_l} = s_l$ and $d_{i|i \in \{0, 1, \ldots M-1\} i \neq m_1, m_2, m_3, \ldots, m_l} = 0$; increasing a spectral efficiency (SE) of the chirp signals as $\rho = ([\log_2(\binom{M}{l} \times H^l)])/M$ bit/second/Hz; and maintaining a peak-to-mean-envelope-power ratio (PMEPR) of the chirp signals to be less than or equal to 1. In another embodiment, l=2.

In another embodiment, the processor is further configured to implement a low complexity maximum-likelihood (ML) detector by evaluating $C_{i,k} = \mathcal{R}\{d_i e^{-j2\pi k/H}\}$ for i=0, 1, ... M−1 and k=0, 1, ... H, and choose two different indices for i and the corresponding k's that maximize $C_{i,k}$. In another embodiment, utilizing the remaining information bits to choose the set {m, n}, further includes constructing a bijection function from integers via a combinatorial number system of degree 2. In another embodiment, identifying $S=[\log_2((_2^M) \times H^2)]$ information bits includes using a random set of integers without changing the cardinality. In another embodiment, the FDSS may be chosen among Bessel functions or Fresnel integers. In another embodiment, the processor is further configured to perform multiple DFT-spread operations to increase the SE of the chirp signals.

DETAILED DESCRIPTION

Figure 1:
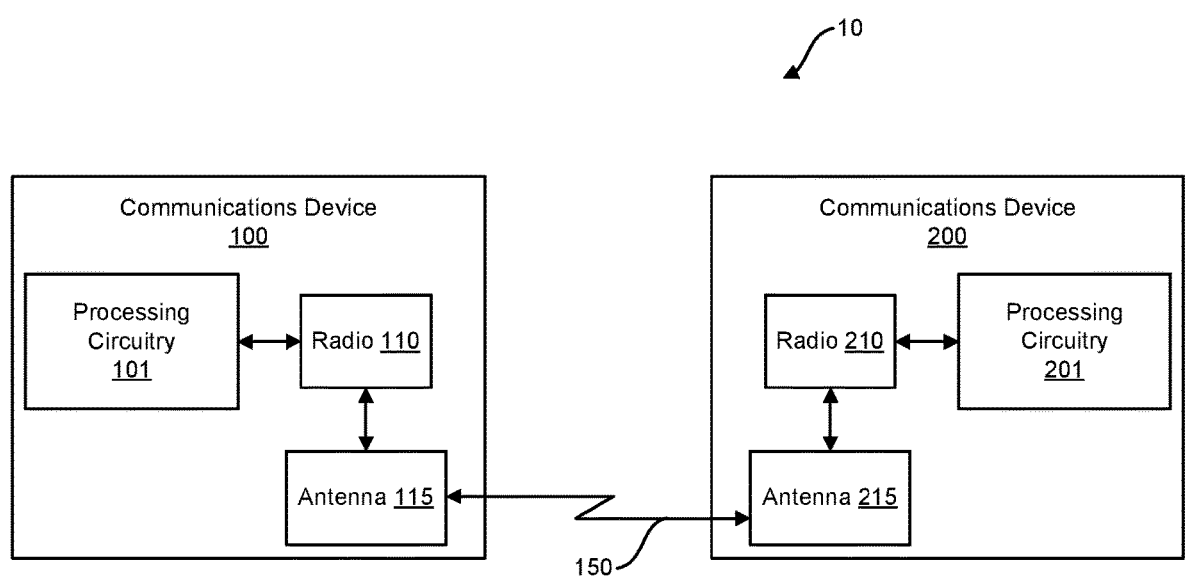
FIG. 1 illustrates an exemplary communications system in accordance with embodiments of the present disclosure.

Some example embodiments now will be described more fully hereinafter with reference to the accompanying drawings, in which some, but not all example embodiments are shown. Indeed, the examples described and pictured herein should not be construed as being limiting as to the scope, applicability, or configuration of the present disclosure. Rather, these example embodiments are provided so that this disclosure will satisfy applicable legal requirements. Like reference numerals refer to like elements throughout.

As used herein the term "or" is used as the logical or where any one or more of the operands being true results in the statement being true. As used herein, the phrase "based on" as used in, for example, "A is based on B" indicates that B is a factor that determines A, but B is not necessarily the only factor that determines A.

According to exemplary embodiments disclosed herein, the present disclosure provides a low-complexity low peak-to-mean envelope power ratio (PMEPR) index modulation scheme and a low-complexity wide-band index modulation (IM) scheme based on complementary sequences (CSs) relying on chirp signals. In some embodiments, a trade-off between PMEPR and spectral efficiency (SE) is considered. The disclosed methodology utilizes the structure of discrete Fourier transform-spread orthogonal frequency division multiplexing (DFT-s-OFDM) with special frequency-domain spectral shaping (FDSS). Therefore, it may be utilized in wireless communication standards without major modification. Also disclosed are embodiments related to practical issues in a communication link for this scheme.

In view of the apparatuses and methods further disclosed herein, exemplary embodiments may be implemented in the context of a communications system 10 as shown in FIG. 1. The communications system 10 may be a complex system of intermediate devices that support communications between communications device 100 and communications device 200, or the communications device 100 and communications device 200 may have a direct link 150, as shown in FIG. 1. In either case, the communications devices 100 and 200 may be configured to support wireless communications.

In this regard, the system 10 may include any number of communications devices, including communications devices 100 and 200. Although not shown, the communications devices may be physically coupled to a stationary unit (e.g., a base station or the like) or a mobile unit (e.g., a mobile terminal such as a cellular phone, a vehicle such as an aerial vehicle, a smart device with IoT capabilities, or the like).

The communications device 100 may comprise, among other components, processing circuitry 101, a radio 110, and an antenna 115. As further described below, the processing circuitry 101 may be configured to control the radio 110 to transmit and receive wireless communications via the antenna 115. In the regard, a wireless communications link 150 may be established between the antenna 115 and the antenna 215 of the communications device 200. Similarly, the communications device 200 may comprise, among other components, processing circuitry 201, radio 210, and the antenna 215. The processing circuitry 201 may be configured the same or similar to the processor 101, and thus maybe configured to control the radio 210 to transmit and receive wireless communications via the antenna 215. As further described below, the configuration of the communications device 200 may be the same or similar to the configuration of the communications device 100 to support communications involving chirp transmissions and multiplexing as described herein.

Figure 2:
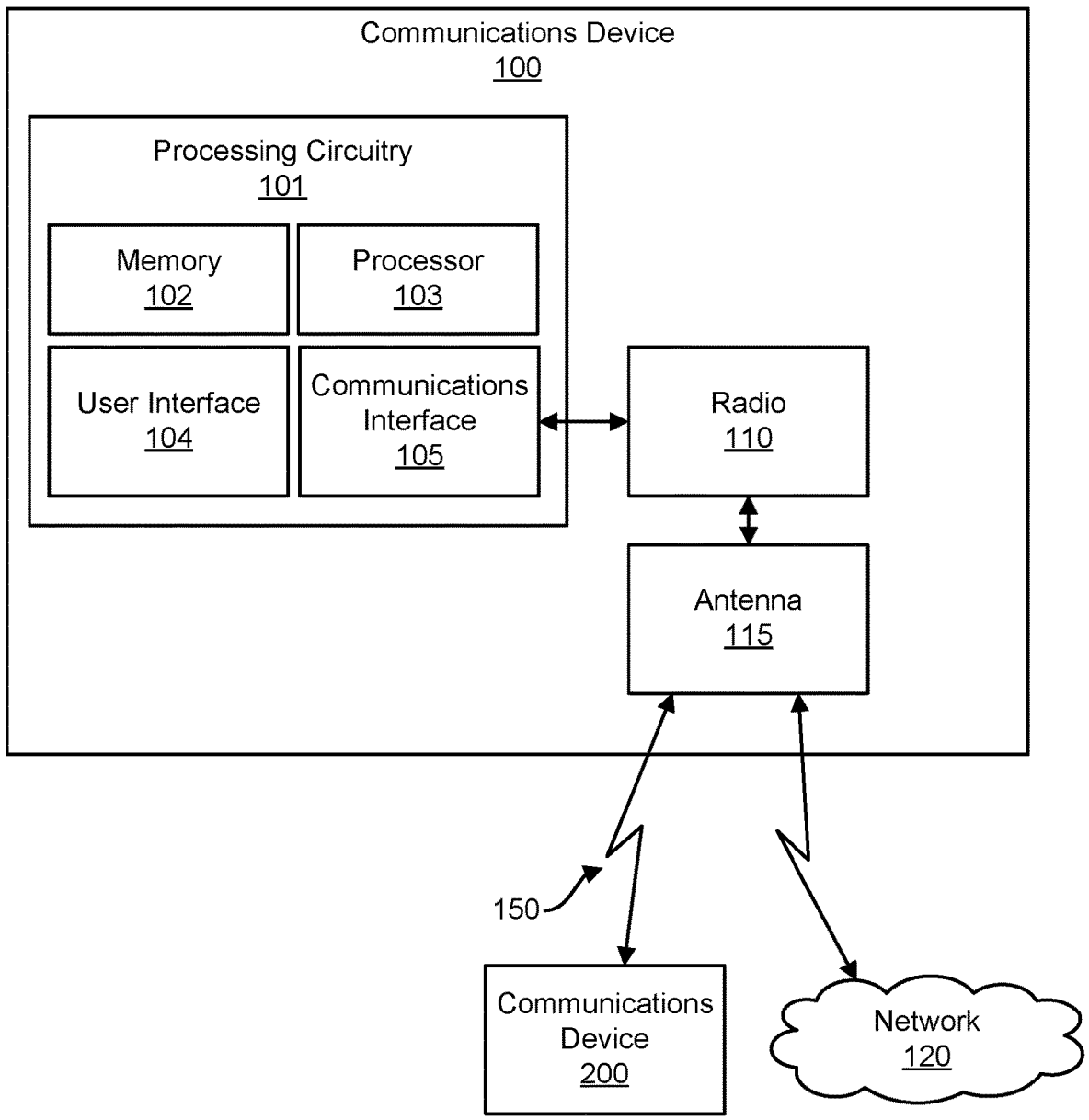
FIG. 2 illustrates an exemplary communications device in accordance with embodiments of the present disclosure.
Figure 4:
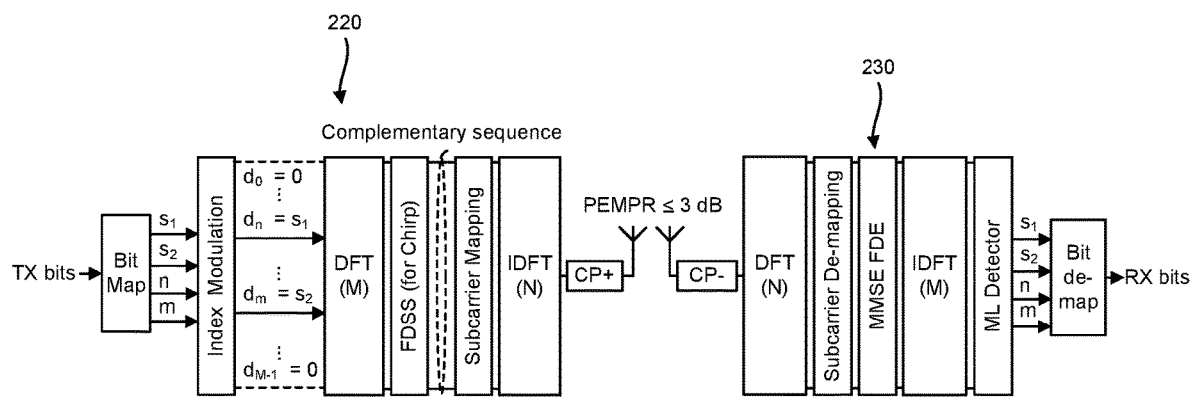
FIG. 4 illustrates a transmitter and receiver in accordance with embodiments of the present disclosure.

In this regard, FIG. 2 shows a more detailed version of the communications device 100, and in particular the processing circuitry 101. Again, shown in FIG. 2, the communications device 100 may comprise the processing circuitry 101, the radio 110, and the antenna 115. However, the link 150 is shown as being a communications link to communications device 200, or as a communications link to the network 120, which may be any type of wired or wireless communications network. A transmitter 220 may be defined as shown in FIG. 4, which may be implemented by the processing circuitry 101 of the communications device 100. In this regard, the transmitter 220 may be configured to increase communication link distance and reliability in a communication channel or dual function radar communication system utilizing chirp signals as provided herein.

The processing circuitry 101 may be configured to receive inputs and provide outputs in association with the various functionalities of the communications device 100. In this regard, the processing circuitry 101 may comprise, for example, a memory 102, a processor 103, a user interface 104, and a communications interface 105. The processing circuitry 101 may be operably coupled to other components of the communications device 100 or other components of a device that comprises the communications device 100.

Further, according to some example embodiments, processing circuitry 101 may be in operative communication with or embody, the memory 102, the processor 103, the user interface 104, and the communications interface 105. Through configuration and operation of the memory 102, the processor 103, the user interface 104, and the communications interface 105, the processing circuitry 101 may be configurable to perform various operations as described herein. In this regard, the processing circuitry 101 may be configured to perform computational processing, memory management, user interface control and monitoring, and manage remote communications, according to an example embodiment. In some embodiments, the processing circuitry 101 may be embodied as a chip or chip set. In other words, the processing circuitry 101 may comprise one or more physical packages (e.g., chips) including materials, components or wires on a structural assembly (e.g., a baseboard). The processing circuitry 101 may be configured to receive inputs (e.g., via peripheral components), perform actions based on the inputs, and generate outputs (e.g., for provision to peripheral components). In an example embodiment, the processing circuitry 101 may include one or more instances of a processor 103, associated circuitry, and memory 102. As such, the processing circuitry 101 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 102 may include one or more non-transitory memory devices such as, for example, volatile or non-volatile memory that may be either fixed or removable. The memory 102 may be configured to store information, data, applications, instructions or the like for enabling, for example, the functionalities described with respect to chirp transmissions and multiplexing. The memory 102 may operate to buffer instructions and data during operation of the processing circuitry 101 to support higher-level functionalities, and may also be configured to store instructions for execution by the processing circuitry 101. The memory 102 may also store image data, equipment data, crew data, and a virtual layout as described herein. According to some example embodiments, such data may be generated based on other data and stored or the data may be retrieved via the communications interface 105 and stored.

As mentioned above, the processing circuitry 101 may be embodied in a number of different ways. For example, the processing circuitry 101 may be embodied as various processing means such as one or more processors 103 that may be in the form of a microprocessor or other processing element, a coprocessor, a controller or various other computing or processing devices including integrated circuits such as, for example, an ASIC (application specific integrated circuit), an FPGA, or the like. In an example embodiment, the processing circuitry 101 may be configured to execute instructions stored in the memory 102 or otherwise accessible to the processing circuitry 101. As such, whether configured by hardware or by a combination of hardware and software, the processing circuitry 101 may represent an entity (e.g., physically embodied in circuitry—in the form of processing circuitry 101) capable of performing operations according to example embodiments while configured accordingly. Thus, for example, when the processing circuitry 101 is embodied as an ASIC, FPGA, or the like, the processing circuitry 101 may be specifically configured hardware for conducting the operations described herein. Alternatively, as another example, when the processing circuitry 101 is embodied as an executor of software instructions, the instructions may specifically configure the processing circuitry 101 to perform the operations described herein.

The communication interface 105 may include one or more interface mechanisms for enabling communication by controlling the radio 110 to generate the communications link 150. In some cases, the communication interface 105 may be any means such as a device or circuitry embodied in either hardware, or a combination of hardware and software that is configured to receive or transmit data from/to devices in communication with the processing circuitry 101. The communications interface 105 may support wireless communications via the radio 110 using various communications protocols (802.11WIFI, Bluetooth, cellular, WLAN, 3GPP NR or the like).

The user interface 104 may be controlled by the processing circuitry 101 to interact with peripheral devices that can receive inputs from a user or provide outputs to a user. In this regard, via the user interface 104, the processing circuitry 101 may be configured to provide control and output signals to a peripheral device such as, for example, a keyboard, a display (e.g., a touch screen display), mouse, microphone, speaker, or the like. The user interface 104 may also produce outputs, for example, as visual outputs on a display, audio outputs via a speaker, or the like.

The radio 110 may be any type of physical radio comprising radio components. For example, the radio 110 may include components such as a power amplifier, mixer, local oscillator, modulator/demodulator, and the like. The components of the radio 110 may be configured to operate in a plurality of spectral bands. Further, the radio 110 may be configured to receive signals from the processing circuitry 101 for transmission to the antenna 115. In some example embodiments, the radio 110 may be a software defined radio.

The antenna 115 may be any type of wireless communications antenna. The antenna 115 may be a configured to transmit and receive at more than one frequency or band. In this regard, according to some example embodiments, the antenna 115 may be an array of antennas that may be configured by the radio 115 to support various types of wireless communications as described herein.

Having described aspects of the components of communications system 10, the following describes the implementation of communications involving wideband index modulation based on chirp signals via configuration of processing circuitry 101 to control radio 110 and the antenna 115. In certain embodiments of the disclosed method, it is shown that a Golay complementary pair (GCP) can be constructed by linearly combining the Fourier series of constant-envelope chirp signals for achieving a low-complexity transmitter and receiver. This result indicates that Fresnel integrals and/or Bessel functions, arising from sinusoidal and linear chirps, respectively, can lead to GCPs. By exploiting this result and the structure of DFT-s-OFDM, a low PMEPR and a low-complexity wideband index modulation (IM) scheme with multiple chirp signals can be achieved. Numerical results show that the proposed method can limit the PMEPR to be less than or equal to 3 dB while achieving a low bit-error ratio (BER) in both additive white Gaussian noise (AWGN) and a fading channel.

Throughout this disclosure, the sets of complex numbers and positive integers are denoted by C and Z+, respectively. The notation $(a_i)^{M-1}$ represents the sequence $a=(a_0, a_1, \ldots, a_{M-1})$. The constant j denotes $-1$. Complex conjugation is denoted by $(\bullet)^*$.

An OFDM symbol with the symbol duration $T_s$ can be expressed in continuous time as a polynomial given by:

$$p_a(z) a_{M-1} z^{M-1} + a_{M-2} z^{M-2} + \ldots + a_0, \quad (1)$$

where $a=(a_0, a_1, \ldots, a_M)$ is a sequence of length M, and $$z \in \{e^{\frac{j2\pi t}{T_s}} \mid 0 \le t < T_s\}.$$

A. Circularly-Shifted Chirps

Let $B_\tau(t) = e^{j\psi_m(t)}$ be the mth circular translation of an arbitrary band-limited function with the duration $T_s$, where $\tau_m$ is the amount of circular shift and $m=0, 1, 2, \ldots, M-1$. By using Fourier series $B_{\tau_m}(t)$ can be approximately expressed as:

$$B_{\tau_m}(t) \approx \sum_{k=L_d}^{L_u} c_k e^{j2\pi k \frac{t-\tau_m}{T_s}}, \quad (2)$$

where $L_d<0$ and $L_u>0$ are integers, and $c_k$ is the kth Fourier coefficient given where $L_d<0$ and $L_u>0$ are integers, and $C_k$ is the kth Fourier coefficient given by:

$$c_k = \mathcal{F}\{e^{j\psi_o(t)}\} \triangleq \frac{1}{T_s} \int_{T_s} e^{j\psi_o(t)} e^{-j2\pi k \frac{t}{T_s}} dt. \quad (3)$$

Let $D/2\,T_s$ be the maximum frequency deviation around the carrier frequency. The approximation in Equation (2) then becomes more accurate for $L_d<D/2$ and $L_u>D/2$. This is due to the fact that $B_{\tau_m}(t)$ is a band-limited function, i.e., $C_k$ approaches zero rapidly for $k>D/2$. Note that the actual bandwidth of a chirp is slightly larger than twice of the maximum frequency deviation. It can be calculated based on total integrated power of the transmitted spectrum, i.e., occupied channel bandwidth (OCB). In the present disclosure, the OCB is expressed as $M_{ocb}/T_s$ Hz where $M_{ocb} \in Z^+$. Also, the instantaneous frequency of $B_{\tau_m}(t)$ around the carrier frequency $f_c$ can be obtained as $$F_m(t) \frac{-1}{2\pi} \frac{d}{dt} \psi_m(t)$$

Hz.

1. Linear Chirps

Let $F_0(t)$ be a linear function changing from $-(D/2\,T_s)$ Hz to $(D/2\,T_s)$ Hz, i.e., $F_0(t) = (D/2t_s)(2t/T_s - 1)$. The kth Fourier coefficient can be calculated as:

$$c_k = \gamma_k (C(\alpha_k) + C(\beta_k) + jS(\alpha_k) + jS(\beta_k)), \quad (4)$$

where $C(\bullet)$ and $S(\bullet)$ are the Fresnel integrals with cosine and sine functions, respectively, and $\alpha_k = (D/2 + 2\pi k)/\sqrt{\pi D}$, $\beta_k = (D/2 - 2\pi k)/\sqrt{\pi D}$, and $$\gamma_k = \sqrt{\frac{\pi}{D}} e^{-j\frac{(2\pi k)^2}{2D} - j\pi k}.$$

2. Sinusoidal Chirps

Let, $$F_0(t) = \frac{D}{2T_s} \cos\left(2\pi \frac{t}{T_s}\right)$$

In this case, the maximum frequency deviation is $D/2\,T_s$ Hz and it can be shown that:

$$c_k = J_k\left(\frac{D}{2}\right), \quad (5)$$

where $J_k(\bullet)$ is the Bessel function of the first kind of order k.

B. Chirps with DFT-s-OFDM

Let complex baseband signal $p(t)$ be a linear combination of the translated chirps as:

$$p(t) = \sum_{m=0}^{M-1} d_m B_{\tau_m}(t), \quad (6)$$

where $d_m \in C$ is the mth modulation symbol, e.g., a phase shift keying (PSK) symbol. It is shown above that if $\tau_m = m/M \times T_s$ (i.e., uniform spacing in time), $p(t)$ in discrete time can be written as:

$$p\left(\frac{nT_s}{N}\right) \approx \sum_{k=L_d}^{L_u} \underbrace{C_k \underbrace{\sum_{m=0}^{M-1} d_m e^{-j2\pi k \frac{m}{M}}}_{M\text{-point DFT}} e^{j2\pi k \frac{n}{N}}}_{\substack{\text{Frequency-domain spectral shaping} \\ N\text{-point IDFT}}}. \quad (7)$$

by sampling $p(t)$ with the period $T_s/N$. The above equation shows that chirp signals can be synthesized by using the DFT-s-OFDM transmitter with a special choice of FDSS sequence which substantially reduces the transmitter complexity. Since a typical DFT-s-OFDM receiver with a single-tap minimum mean square error (MMSE) frequency-domain equalization (FDE) can be utilized, it also offers a low-complexity at the receiver side. Note that the condition $M \ge M_{ocb} > D$ must hold true to be able represent a chirp by using M subcarriers. In this disclosure, it is contemplated that $Lu-Ld+1=M$ to avoid FDSS beyond M subcarriers.

C. Complementary Sequences

The sequence pair (a, b) of length M is a GCP if $\rho_a(k) + \rho_b(k) = 0$ for $k \ne 0$ where $\rho_a(k)$ and $\rho_b(k)$ are the aperiodic autocorrelations (APACs) of the sequences a and b at the kth lag, respectively. Each sequence in a GCP is called a CS. A GCP (a, b) can also be defined as any sequence pair satisfying $$\left|p_a\left(e^{\frac{j2\pi t}{T_s}}\right)\right|^2 + \left|p_b\left(e^{\frac{j2\pi t}{T_s}}\right)\right|^2 = \rho_a(0) + \rho_b(0).$$

If a CS is transmitted with an OFDM waveform, the instantaneous peak power of the corresponding signal is bounded, i.e., $$\max_t \left| p_a\left(e^{\frac{j2\pi t}{T_s}}\right) \right|^2 \le \rho_a(0) + \overline{\rho}_b(0).$$

As a result, the PMEPR of the OFDM symbol $$p_a\left(e^{\frac{j2\pi t}{T_s}}\right),$$

defined as $$\max_t p_a\left(e^{\frac{j2\pi t}{T_s}}\right) / P_{av},$$

is less than or equal to $10 \log_{10} 2 \approx 3$ dB if $P_{av} = \rho_a(0) = \beta_b(0)$. Note that for non-unimodular CSs, $\rho_a(0)$ may not be equal to $\rho_b(0)$. In that case, the power of OFDM symbol with a can be different from the one with b although the instantaneous peak power is still less than or equal to $\rho_a(0)+\rho_b 0$) for both symbols. Hence, to avoid misleading results, $P_{av}$ is defined as the power of the complex baseband signal in this disclosure.

Chirp-Based Complementary Sequences

Theorem 1. Let $x(t) \in C$ and $y(t) \in$ be two signals defined by:

$$x(t) = d_n e^{j\psi_n(t)} + d_m e^{j\psi_m(t)}, \quad (8)$$

$$y(t) = d_n e^{j\psi_n(t)} - d_m e^{j\psi_m(t)}, \quad (9)$$

where $d_n, d_m \in C$ and $d_n = 1$. The Fourier coefficients of $x(t)$ and $y(t)$ form a GCP.

By the definition, it needs to be shown that $|x(t)|^2 + |y(t)|^2$ is constant.

$$|x(t)|^2 = |d_n|^2 + |d_m|^2 + d_n d_m^* e^{j(\psi_n(t) - \psi_m(t))} + d_n^* d_m e^{-j(\psi_n(t) - \psi_m(t))}.$$

Similarly, $$|y(t)|^2 = |d_n|^2 + |d_m|^2 - d_n d_m (e^{-j(\psi_n(t) - \psi_m(t))} + e^{j(\psi_n(t) - \psi_m(t))}).$$

Therefore, $|x(t)|^2 + |y(t)|^2 = 2 \times (|d_n|^2 + |d_m|^2) = 4$, which implies that $F\{x(t)\}$ and $F\{y(t)\}$ form a GCP. Theorem 1 indicates that the Fourier coefficients of a linear combination of the frequency response of two constant-envelop chirps result in a CS. As a result, it yields a connection between Bessel functions and Fresnel integrals with CSs.

Example 1. Assume that $x(t)$ and $y(t)$ are linear combinations of two circularly-shifted versions of a band-limited sinusoidal chirp defined above. Therefore, by using equations 2 and 5 above, the Fourier coefficients of $x(t)$ and $y(t)$ are obtained as:

$$a_k = d_m J_k\left(\frac{D}{2}\right)e^{-j2\pi k \frac{T_m}{T_s}} + d_n J_k\left(\frac{D}{2}\right)e^{-j2\pi k \frac{T_n}{T_s}} \quad (10)$$

$$b_k = d_m J_k\left(\frac{D}{2}\right)e^{-j2\pi k \left(\frac{T_m}{T_s}\right)} - d_n J_k\left(\frac{D}{2}\right)e^{-j2\pi k \frac{T_n}{T_s}} \quad (11)$$

respectively. Based on Theorem 1, $(a_i)_{i=-\infty}^{\infty}$ and $(b_i)_{i=-\infty}^{\infty}$ form a GCP. Since the sunusoidal chirps are band-limited signals, the amplitude of a Fourier coefficient approaches zero for $|i| \ge D/2$. Therefore, $(a_i)_{i=L_d}^{L_u}$ and $(b_i)_{i=L_d}^{L_u}$ are approximately GCP. Note that if the sinusoidal chirps are replaced by the linear chirps, by using equation (4), the Fourier coefficients of $x(t)$ and $y(t)$ can be calculated as:

$$a_k = d_m \gamma_k (C(\alpha_k) + C(\beta_k) + jS(\alpha_k) + jS(\beta_k))e^{-j2\pi k \frac{T_m}{T_s}} +$$
$$d_n \gamma_k (C(\alpha_k) + C(\beta_k) + jS(\alpha_k) + jS(\beta_k))e^{-j2\pi k \frac{T_n}{T_s}}$$

$$b_k = d_m \gamma_k (C(\alpha k) + C(\beta_k) + jS(\alpha_k) + jS(\beta_k))e^{-j2\pi k \frac{T_m}{T_s}} -$$
$$d_n \gamma_k (C(\alpha k) + C(\beta_k) + jS(\alpha_k) + jS(\beta_k))e^{-j2\pi k \frac{T_n}{T_s}}$$

Figure 3:
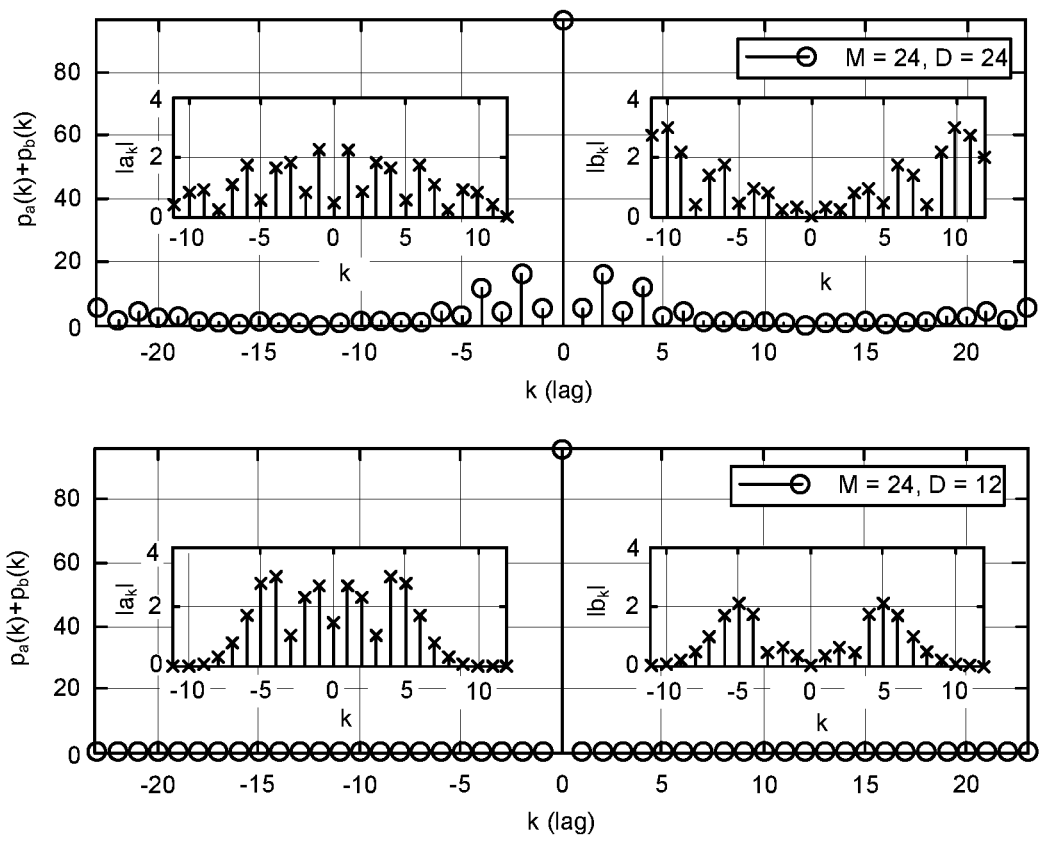
FIG. 3 illustrates an instance of a Golay complementary pair (GCP) synthesized through sinusoidal chirps in accordance with embodiments of the present disclosure.

Referring now to FIG. 3, exemplified herein is a GCP of length M=24, synthesized through equations (10) and (11) for $L_d$=11, $L_u$=12, $\tau_m/T_s$=0/24, $\tau_n/T_s$=1/24, and $d_m$=$d_n$=1. When D=24, the sequences are truncated heavily. Therefore, it does not satisfy the definition of a GCP given above. On the other hand, when the maximum frequency deviation is halved, $M_{ocb}$ is 15 for containing 99% of the total integrated power of the spectrum. Hence, M=24 forms the chirps well and the resulting sequences form a GCP. It is also worth noting that synthesized CSs are not unimodular sequences. Therefore, the mean power of OFDM symbol changes although instantaneous power is bounded.

Corollary 2. Let the coefficients $d_n$, $d_m$ $$\in S_{PSK,H} \triangleq \left\{ e^{j2\pi \times \frac{k}{H}} \mid k = 0, 1, \ldots, H-1 \right\}.$$

Let $S_{chirp} \triangleq \{B_{\tau_m}(t) | m=0, 1, \ldots, M-1\}$ be a set of M uniformly circularly-shifted chirps of an arbitrary band-limited function with the duration $T_s$ and $M_{ocb} \le M$. Without using the same chirp twice, the total number of distinct CSs of length M is $\binom{M}{2} \times H^2$.

Since $|S_{PSK,H}|$=H, there exist $H^2$ there exist $H^2$ combinations for $\{d_n, d_m\}$. As $|_{chirp}|$=M, $e^{j\psi_n(t)}$ and $e^{j\psi_n(t)}$ in Equation (8) can be chosen in $\binom{M}{2}$ ways without using the same chirp. Thus, the total number of CSs is $\binom{M}{2} \times H^2$ via Theorem 1. The CSs are distinct as $B_{\tau_m}(t)$ are distinct. Since the OCB of $B_{\tau_m}(t)$ is less than or equal to $M/T_s$, the length of the synthesized CS is M based on Nyquist's sampling theorem.

In one embodiment, a low-complexity methodology with DFT-s-OFDM is provided. In this embodiment, Corollary 2 is used to develop a wideband IM scheme by using the structure of DFT-s-OFDM discussed above. At the transmitter, $S = \lfloor \log_2((\binom{M}{2}) \times H^2) \rfloor$: information bits is considered. Assuming H is an integer power-of-two, $2 \log_2(H)$ of the information bits is mapped to $s_1$ and $s_2$, where $s_1, s_2 \in S_{PSK,H}$. The rest of the information bits are utilized to choose a set $\{m, n\}$, where $m, n \in \{0, 1, \ldots, M-1\}$ and $n \ne m$. Modulation symbols are generated as $d_n = s_1$, $d_m = s_2$, and $d_l | i \in \{0, 1, \ldots, M-1\} | \ne n$, m=0. The transmitted signal is then synthesized according to Equation (7).

FIG. 4 illustrates, in one embodiment, a block diagram of an exemplary transmitter 220 and a block diagram of an exemplary receiver 230 utilizing the principles of the present disclosure. First, M-point DFT of the modulation symbols $(d_0, d_1, \ldots, d_{M-1})$ is calculated. The resulting sequence is then shaped in the frequency domain with an FDSS for generating chirps. According to Corollary 2, after FDSS, a CS is formed since there are only two modulation symbols for the proposed methodology. The resulting CS is then mapped to the OFDM subcarriers. After an N-point inverse DFT (IDFT) of the mapped CS, the resulting signal is transmitted with a cyclic prefix (CP).

At the receiver side, a single-tap MMSE-FDE is considered and a maximum-likelihood (ML) detector for detecting m, n, $s_1$, and $s_2$. Let $(\bar{d}_0, \bar{d}_1, \ldots, \bar{d}_{M-1})$ be the received modulation symbols after M-point IDFT operation. Since $|s_1|=|s_2|=1$, the ML detector for n, m, $s_1$, and $s_2$ can be expressed as:

$$\{\{\hat{m}, \hat{n}\}, \hat{s}_1, \hat{s}_2\} = \arg \max_{\substack{\{m,n\}, s_1, s_2 \\ m \neq n}} \Re\{\tilde{d}_n s_1^* + \tilde{d}_m s_2^*\}. \quad (12)$$

As $m \neq n$, a low-complexity ML detector can be implemented by evaluating $C_{i,k} = \Re\{\mathcal{R}_i e^{-j2\pi k/H}\}$ for i=0, 1 ..., M−1 and k=0, 1, . . . , H and choosing two different indices for i and the corresponding k's that maximize $C_{i,k}$.

For a practical radio, the mapping from the information bits to a combination of {m, n} at the transmitter (and vice versa for the receiver) may be a challenge. This can be addressed by constructing a bijection function from integers to the set of combinations via a combinatorial number system of degree 2, also called combinadics. Since $\log_2 (_2^M)$ is not an integer for M>2, some of the indices are used more often than the others. In some embodiments, this issue can cause asymmetric main lobe for the corresponding frequency spectrum. To remedy this, rather than using the natural order for the integers, a set of randomized integers can be used without changing the cardinality of the set. In one embodiment, the distance between two indices may be larger than a certain value. This may be utilized to ensure randomness or reduce potential interference due to the communication channel.

Let S denote the minimum separation between the two indices. The total number of combinations allowed is $(_2^{M-S+1}) - (_2^S)$. If the spectral efficiency remains the same, the maximum separation can be expressed as, $$S_{max} = \left\lfloor 1 + \frac{\binom{M}{2} - 2^{\lfloor \log_2 \binom{M}{2} \rfloor}}{M} \right\rfloor.$$

For example, set M=16 and S=3. Then {1, 2} is not a valid combination of indices as the separation between the indices is 1. But {1,4} is a valid combination as the separation is 3. The total number of allowed combinations is 88 and the maximum separation is 4.

Figure 5:
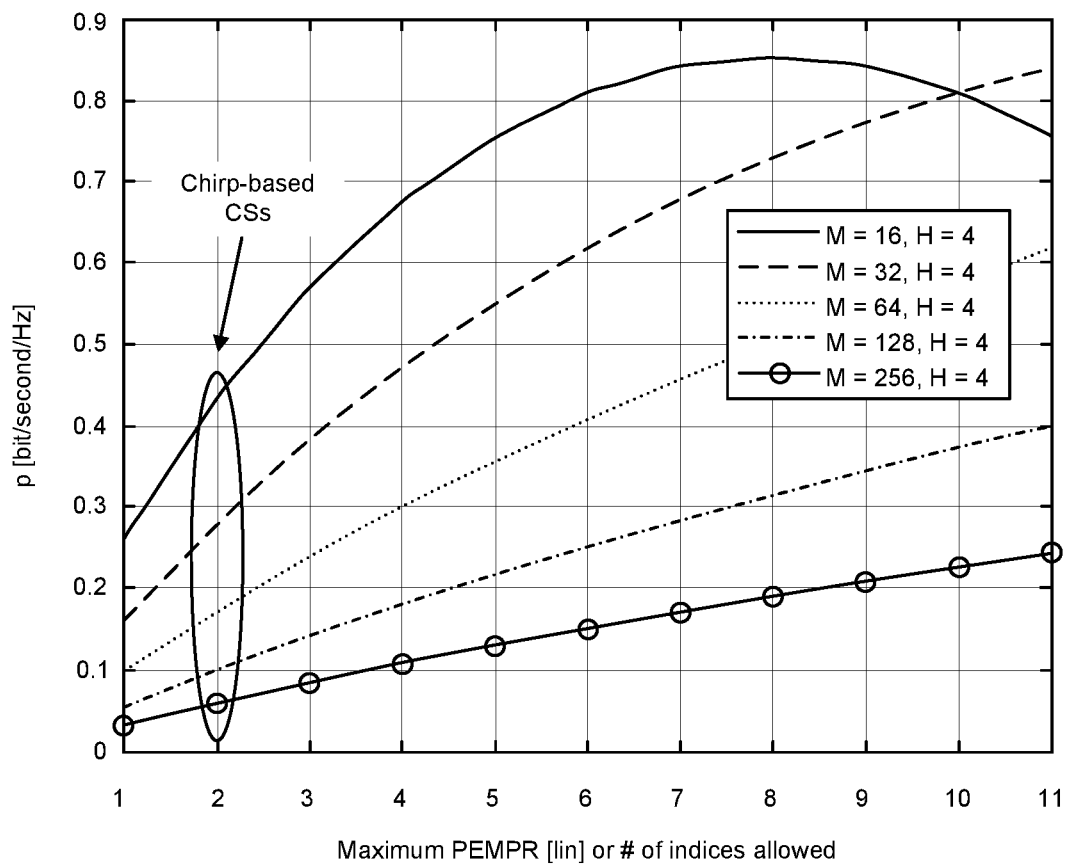
FIG. 5 illustrates a trade-off between SE and PMEPR in accordance with embodiments of the present disclosure.

The choice of FDSS is used for obtaining a good bit-error ratio (BER) performance and a low PMEPR. For example, in some embodiments, a linear chirp offers a more flat FDSS as compared to the one with a sinusoidal chirp. In some embodiments, a flatter FDSS improves the BER performance for the receiver with a single-tap MMSE-FDE. On the other hand, a linear chirp causes abrupt instantaneous frequency changes within the IDFT duration. Therefore, it requires a much lower D as compared to the one for a sinusoidal chirp for a given M. This issue can distort the targeted CSs and cause a larger PMEPR than the theoretical bound, as demonstrated above, If more than two indices are allowed to be utilized, the proposed methodology of the present disclosure can be generalized to provide a trade-off between maximum PMEPR and SE. Let l denote the number of indices that are allowed to be used. The SE of the proposed method can be calculated as:

$$\rho = \frac{\lfloor \log_2((_l^M) \times H^l) \rfloor}{M} \text{ bit/second/Hz,} \quad (13)$$

while the PMEPR of a signal is always less than or equal to l as l chirps are transmitted simultaneously. In FIG. 5, what is shown is the trade-off between the maximum PMEPR and the SE for a given M and H=4 by changing l from 1 to 11. The generalized scheme reduces to the scheme in FIG. 4 with CSs for l=2. If there is room for more transmit power, l>2 can be utilized for increasing the SE while still limiting PMEPR.

In exemplary embodiments, the symbol duration and the CP duration are set to $T_s$=16.67 µs and $T_s$=2.34 µs, respectively. It is assumed that the transmitter uses M=384 OFDM subcarriers. Thus, the signal bandwidth is $M/T_s$=23.04 MHz and the CS length is 384. In an exemplary embodiment, D=300 can be chosen. The data symbols were generated based on binary phase-shift keying (BPSK) and quadrature phase-shift keying (QPSK), i.e., H={2, 4}. For the fading channel, ITU Extended Vehicular A (EVA) power delay profile is considered. At the transmitter, the combinations {m, n} are generated by mapping a natural order of integers to combinations. At the receiver, all possible {m, n} combinations are considered and a non-valid combination (e.g., due to the noise) is mapped to a valid combination to avoid unwanted results.

Time and Frequency Characteristics

Figure 6A:
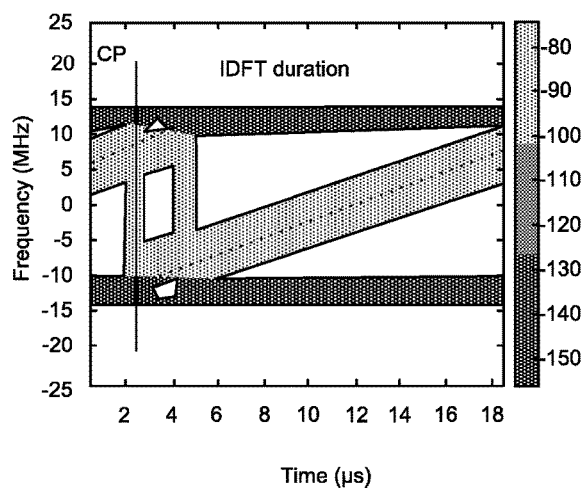
FIG. 6A illustrates a spectrogram showing the time and frequency characteristics of a signal in accordance with embodiments of the present disclosure.
Figure 6B:
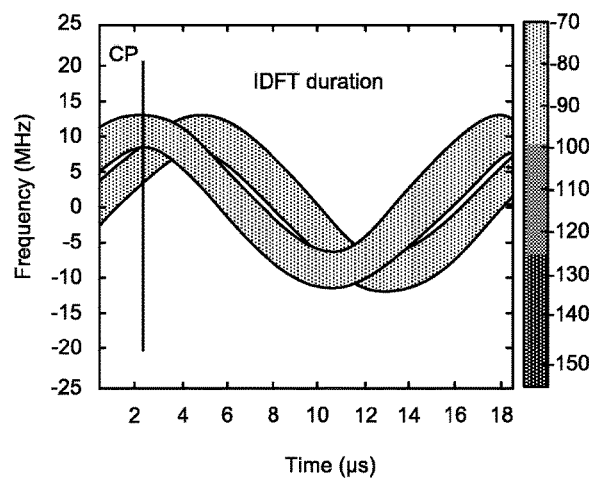
FIG. 6B illustrates a spectrogram showing the time and frequency characteristics of a signal in accordance with other embodiments of the present disclosure.

FIGS. 6A through 6F bookmark 24 illustrate, in some embodiments, the time and frequency characteristics of the signals obtained utilizing the methodology of the present disclosure. In FIG. 6A and FIG. 6B, the spectrograms of two signals generated with the methodology of the present disclosure are exemplified for linear and sinusoidal chirps, respectively. In one embodiment, n=0 and m=50 are chosen and the PSK symbols are set to 1. Since the CS is a linear combination of two Bessel functions, the methodology of the present disclosure leads to two chirps transmitted simultaneously.

Figure 6C:
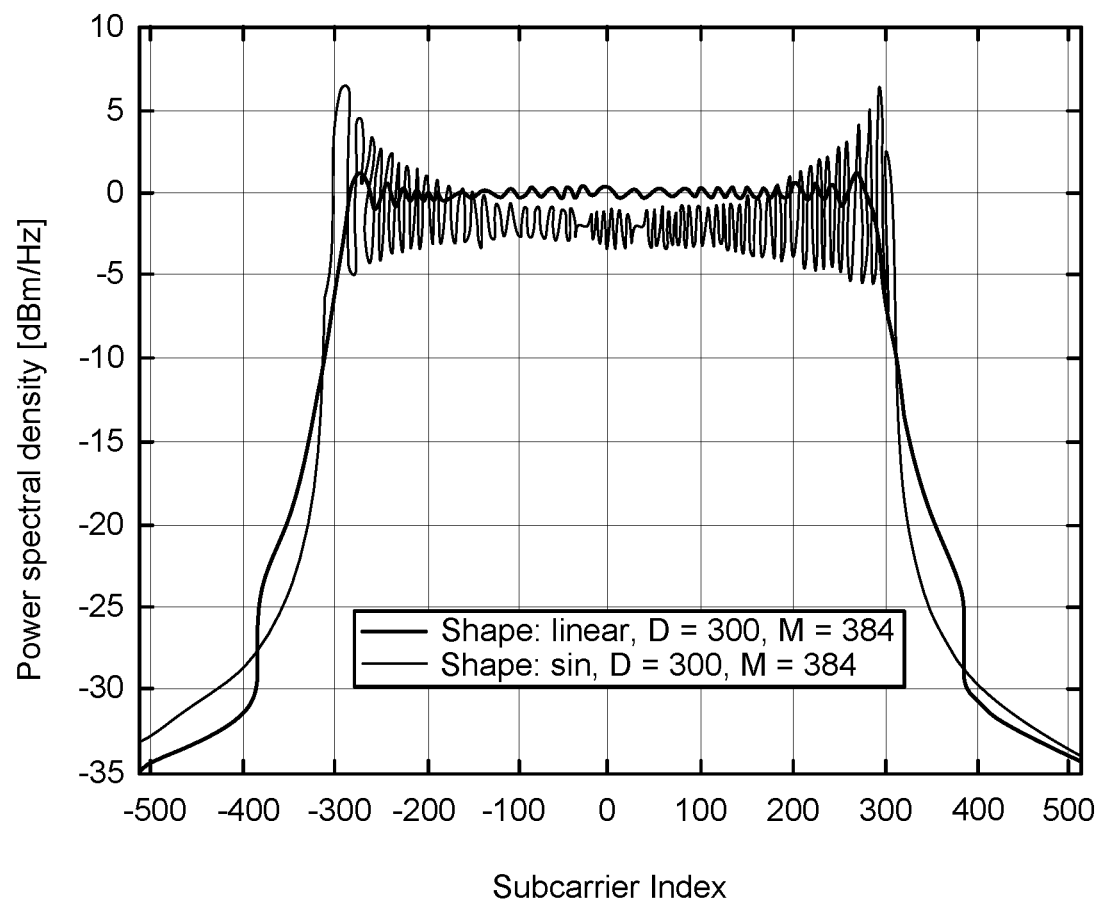
FIG. 6C illustrates the Power Spectral Density (PSD) of generated signals in accordance with embodiments of the present disclosure.
Figure 6D:
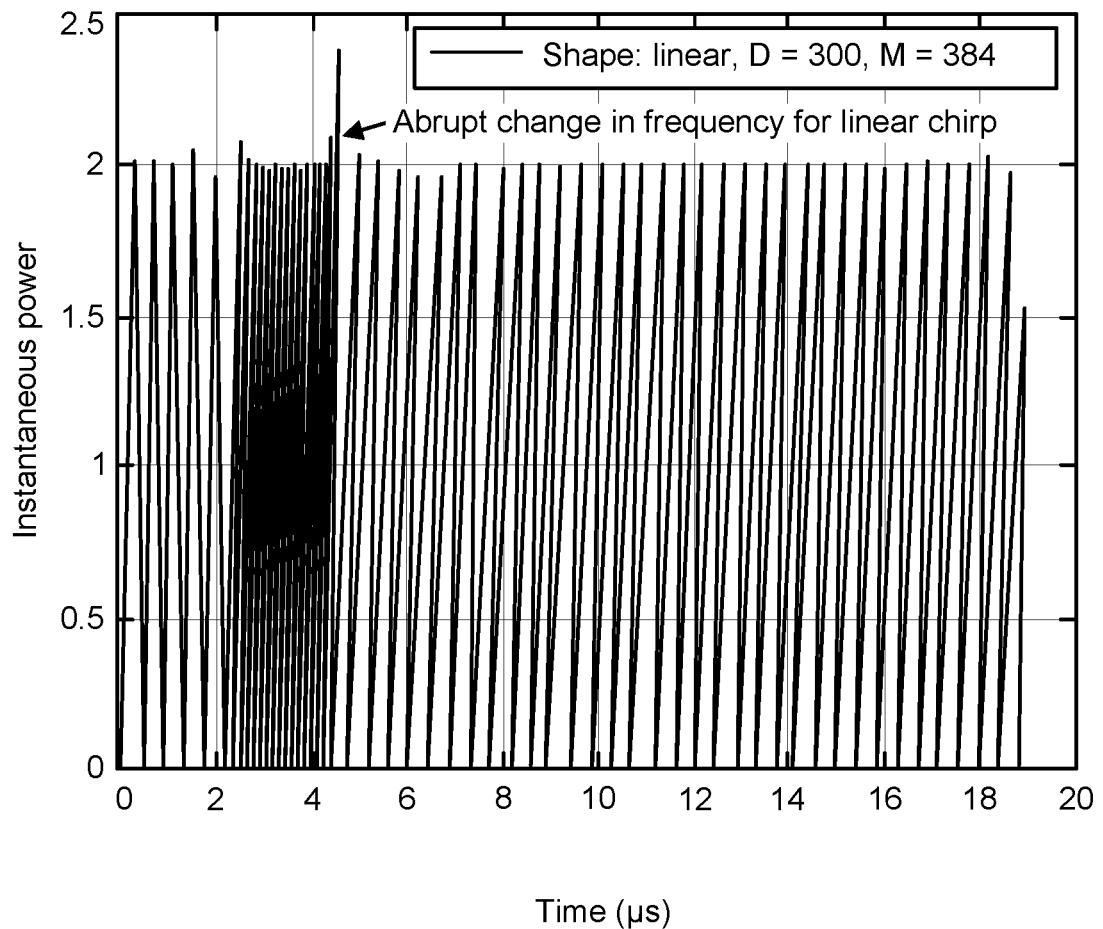
FIG. 6D illustrates instantaneous signal power of a signal generated with linear chirp signals in accordance with embodiments of the present disclosure.
Figure 6E:
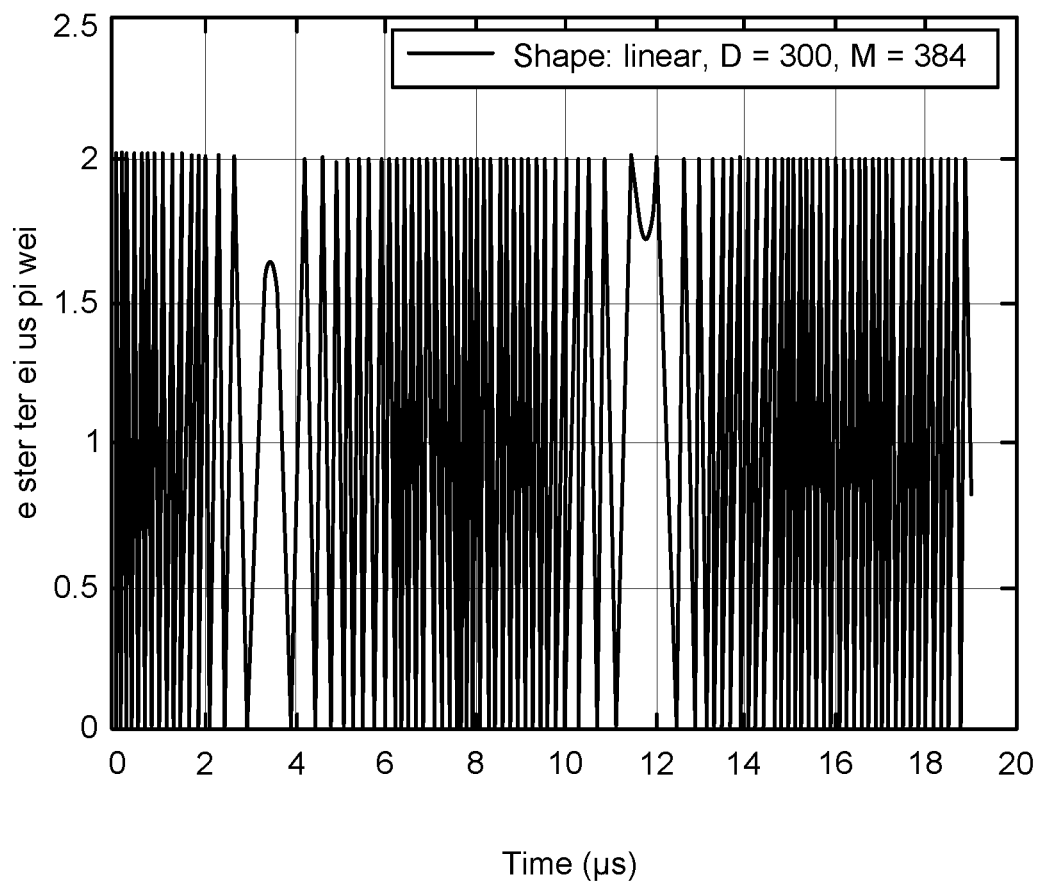
FIG. 6E illustrates instantaneous signal power of a signal generated with sinusoidal chirps in accordance with embodiments of the present disclosure.

FIG. 6D and FIG. 6E plot the corresponding time-domain signals by using the same settings. The transmitted signals for both cases are not a constant envelope. With sinusoidal chirps, the instantaneous signal power does not exceed 2. This can be understood either by the summation of two chirps or the properties of a CS. Similar behavior is also observed when FDSS is calculated with Equation (4). However, the linear chirps are not represented well with 384 subcarriers as compared to sinusoidal chirps. Therefore, the CS is not accurately formed with Fresnel integrals under our simulation settings. The reason why linear chirp requires a larger M can be seen in FIG. 6A, which illustrates the abrupt instantaneous frequency change.

FIG. bookmark 206C plots the power spectral density (PSD) of the generated signal by using linear and sinusoidal chirps. The results show that the methodology of the present disclosure can result in wideband signals with IM, as opposed to OFDM with IM. The main lobe of the signal in the frequency domain is not flat and a majority of the symbol energy is carried over the edge subcarriers, which follows the same results obtained in Equation [2]. This result is expected as DFT spread operation uniformly distributes the symbol energy in the frequency domain while FDSS re-shapes it in the frequency.

Figure 6F:
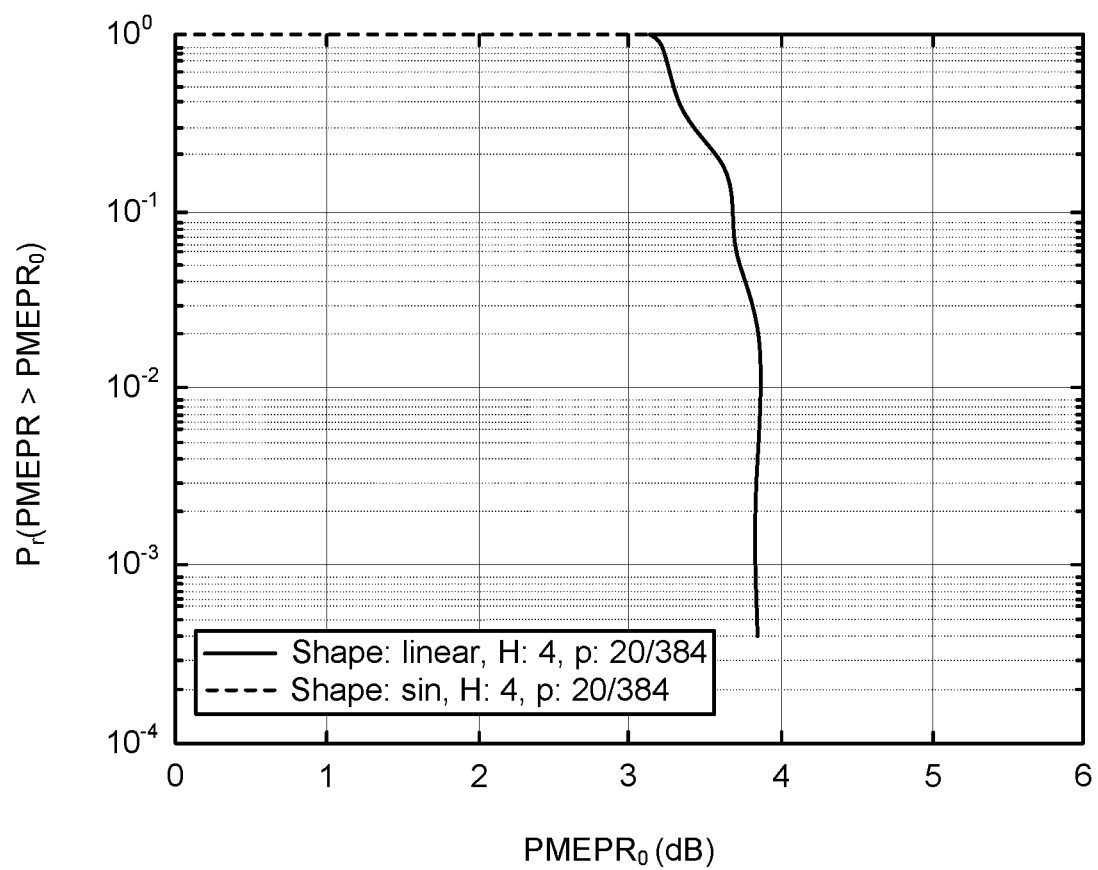
FIG. 6F illustrates a PMEPR distribution in accordance with embodiments of the present disclosure.

In FIG. 6F, the corresponding PMEPR distributions are given. The PMEPR is always less than or equal to 3 dB for sinusoidal chirps. However, because of the heavy truncation in the frequency domain for linear chirps, the PMEPR is slight larger 3 dB for linear chirps.

BER Results

Figure 7:
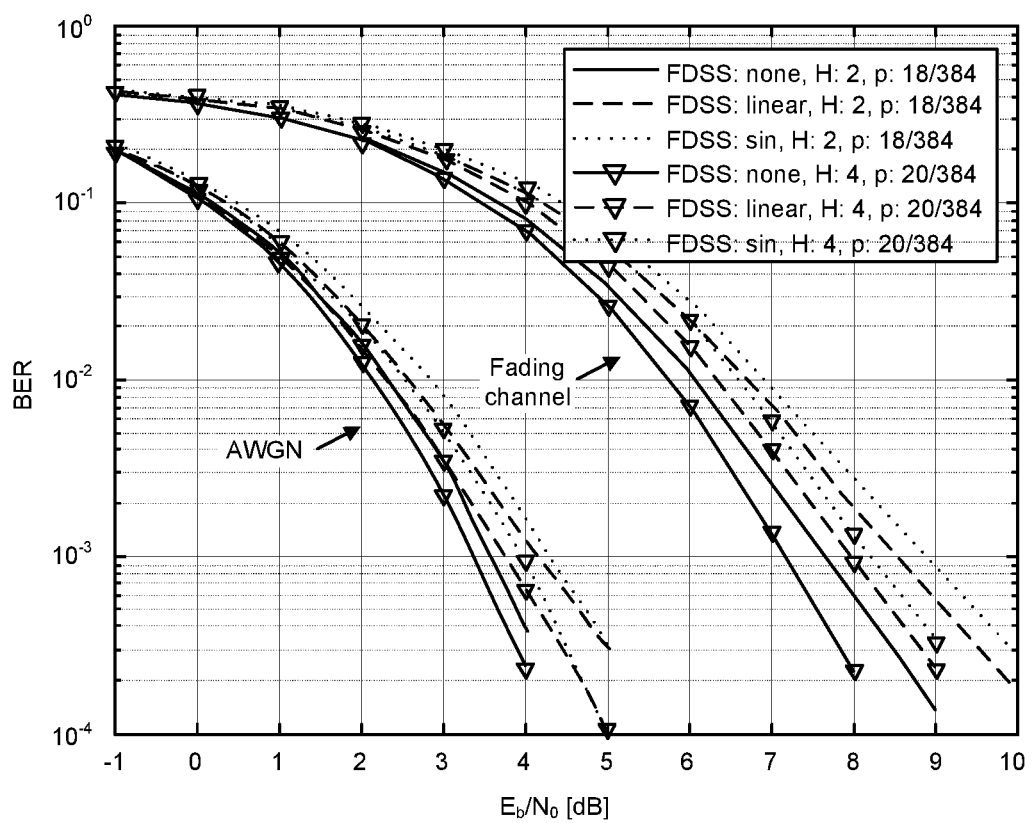
FIG. 7 illustrates Bit Error Ratio (BER) vs. $E_b/N_0$ in additive white Gaussian noise (AWGN) and a fading channel in accordance with embodiments of the present disclosure.
Figure 8:
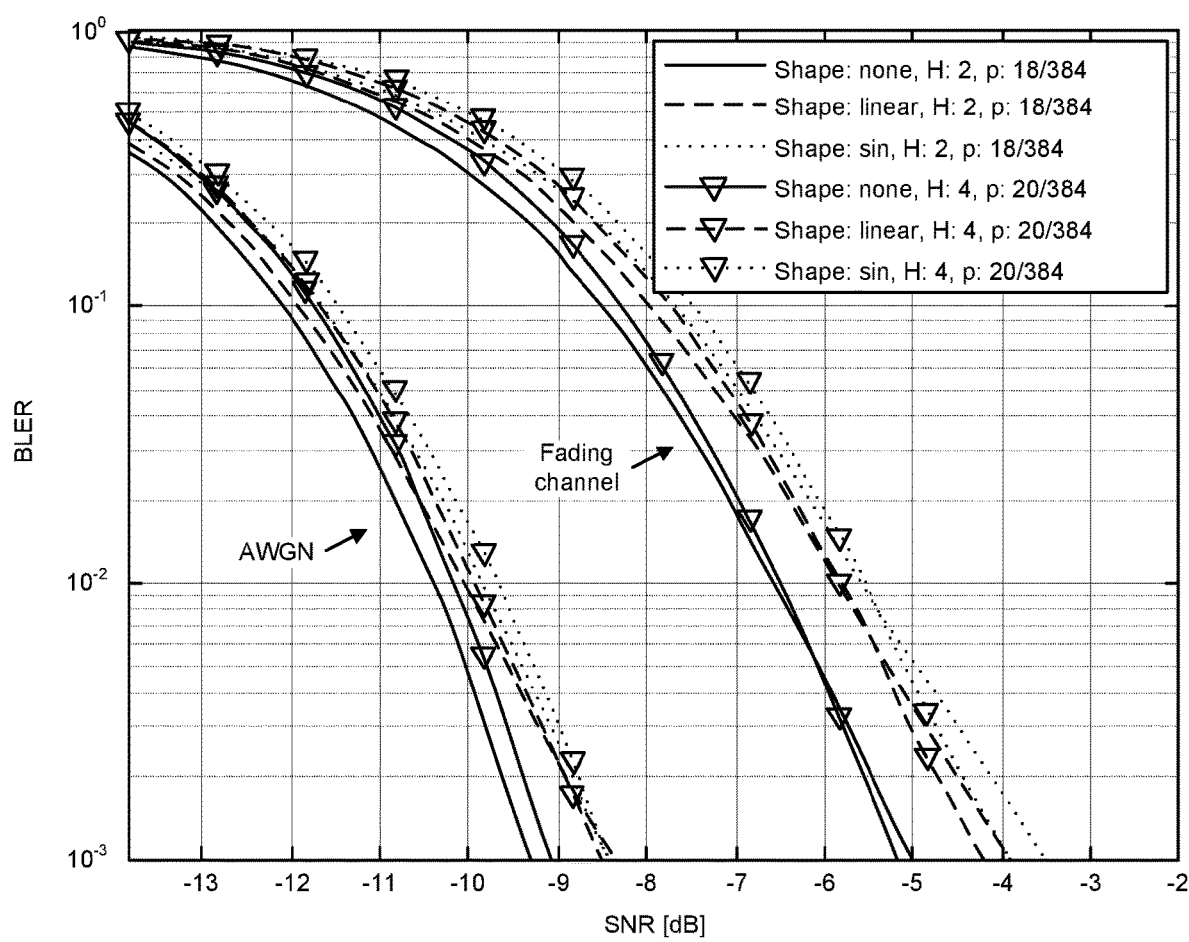
FIG. 8 illustrates Block Error Rate (BLER) vs. Signal-to-Noise-Ratio (SNR) in AWGN and a fading channel in accordance with embodiments of the present disclosure.

In FIG. 7 and FIG. 8, the error-rate performance of the proposed methodology of the present disclosure in additive white Gaussian noise (AWGN) and fading channels is analyzed. Since the methodology of the present disclosure utilizes IM and DFT is an orthogonal transformation, it inherits the structural properties of orthogonal frequency-shift keying (FSK) with coherent detection at the receiver. Therefore, the error rate reduces for a larger M for a given $E_b/N_0$ as in FSK. The FDSS is chosen based on Equation (5) for sinusoidal chirps and Equation (4) for linear chirps. The case without FDSS is also included as a reference. It is assumed that the channel and FDSS information are available at the receiver.

In one embodiment, the receiver of the present disclosure equalizes the signal in the frequency domain even in the AWGN channel because of FDSS. Therefore, a flatter response improves the BER result in both AWGN and fading channels as demonstrated in FIG. 7. Since FDSS for linear chirp is flatter than that of sinusoidal chirp as shown in FIG. 6C, the proposed scheme with linear chirps yields better BER performance. In AWGN, the proposed schemes with different FDSS operate in the range of 3.5 dB-4.5 dB for $E_b/N_0$ at 1e-3 BER. In fading channel, the scheme gives the same performance at $E_b/N_0$=8 dB approximately and the difference between sinusoidal and linear chirps is around 0.5 dB for both H=2 and H=4. The slopes of the BER curves for AWGN and fading channel are similar to each other as the transmitted signals are wideband. A similar trend is also observed for block error rate (BLER) performance as given in FIG. 8. Since M=384 and l=2 for the proposed scheme, a large processing gain is obtained, which results in a low BLER at a low signal-to-noise ratio (SNR).

In the present disclosure, it is shown that there is a connection between CS and the frequency response of the chirp signals. It is shown that Bessel functions and Fresnel integrals can be useful for generating GCPs. By utilizing this relationship, a low-complexity low-PMEPR IM is developed. Also discussed is a generalization of the proposed methodology, which yields a trade-off between SE and PMEPR. Since the proposed methodology utilizes the structure of DFT-s-OFDM with special FDSS, it can be utilized in wireless communication standards without major modifications. It is shown that FDSS design is used for forming CSs accurately. The present disclosure illustrates that CSs from linear chirps require larger number coefficients as compared to the ones from sinusoidal chirps for the same amount maximum frequency deviation. Numerical results indicate that the proposed scheme can provide 3 dB PMEPR and 1e-3 BER at approximately $E_b/N_0$=4 dB for the AWGN channel.

The methodology disclosed herein can, in some embodiments, be utilized to transmit a larger number of information bits under a PMEPR constraint. In some embodiments, utilizing Reed-Muller (RM) codes with the proposed methodology is one of the potential approaches. In other embodiments, the disclosed methodology can be enhanced for multi-user scenarios.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A method, performed at a transmitter, for increasing communication link distance and reliability in a communication channel or dual function radar communication system, the method comprising:
   calculating an information sequence, indices of non-zero elements and corresponding values in the sequence indicating information bits to be transmitted;
   shaping a Discrete Fourier Transform (DFT) of the information sequence by special frequency-domain spectral shaping (FDSS) in the frequency domain to form a frequency-domain representation of chirp signals;
   mapping the shaped sequence to orthogonal frequency division multiplexing (OFDM) subcarriers;
   performing an inverse DFT of the mapped shaped sequence to form chirp signals to be transmitted; and
   a transmitting the chirp signals with a cyclic prefix (CP).

2. The method of claim 1, further comprising generating a complementary sequence (CS) by linearly combining frequency responses of two constant-amplitude chirp signals.

3. The method of claim 2, wherein transmitting the chirp signals comprises constructing at least one of a Golay complementary pair and a CS based on the shaped DFT of the information sequence.

4. The method of claim 1, wherein transmitting l number of chirp signals further comprises:
   identifying $S=[\log_2((_l^M) \times H^l)]$ information bits, where H represents an integer power-of-two, and M represents a number of circularly-shifted chirp signals;
   mapping l $\log_2$ of H of the identified information bits to $\{s_1, s_2, s_3, \ldots, s_l\}$, where $s_1, s_2, s_3, \ldots, s_l \in \mathcal{S}_{PSK,H}$;
   utilizing the remaining information bits to choose a set of indices $\{m_1, m_2, m_3, \ldots, m_l\}$, where $m_1, m_2, m_3, \ldots, m_l \in \{0, 1, \ldots M-1\}$ and $m_1 < m_2 < m_3 < \ldots < m_l$;
   generating modulation symbols as $d_{m_1}=s_1, d_{m_2}=s_2, d_{m_3}=s_3, \ldots, d_{m_l}=s_l$ and $d_{i|i \in \{0, 1, \ldots M-1\} i \neq m_1, m_2, m_3, \ldots, m_l}=0$
   increasing a spectral efficiency (SE) of the chirp signals as $\rho=([\log_2((_l^M) \times H^l)])/M$ bit/second/Hz; and
   maintaining a peak-to-mean-envelope-power ratio (PMEPR) of the chirp signals to be less than or equal to 1.

5. The method of claim 4, wherein l=2.

6. The method of claim 1, further comprising:
   implementing a low complexity maximum-likelihood (ML) detector by evaluating $C_{i,k}=\mathcal{R}\{d_i e^{-j2\pi k/H}\}$ for i=0, 1, ... M−1 and k=0, 1, ... H; and choosing two different indices for i and the corresponding k's that maximize $C_{i,k}$.

7. The method of claim 4, wherein utilizing the remaining information bits to choose the set {m, n}, further comprises:
constructing a bijection function from integers via a combinatorial number system of degree 2.

8. The method of claim 4, wherein identifying $S=[\log_2((_2^M)\times H^2)]$ information bits includes using a random set of integers without changing the cardinality.

9. The method of claim 1, wherein the FDSS may be chosen among Bessel functions or Fresnel integers.

10. The method of claim 1, further comprising performing multiple DFT-spread operations to increase the spectral efficiency (SE) of the chirp signals.

11. A transmitter implemented by processing circuitry, the processing circuitry comprising a processor and a memory containing instructions executable by the processor, the processor configured to:
calculate an information sequence, indices of non-zero elements and corresponding values in the sequence indicating information bits to be transmitted;
shape a Discrete Fourier Transform (DFT) of the information sequence by special frequency-domain spectral shaping (FDSS) in the frequency domain to form a frequency-domain representation of chirp signals;
map the shaped sequence to orthogonal frequency division multiplexing (OFDM) subcarriers; and
perform an inverse DFT of the mapped shaped sequence to form chirp signals to be transmitted,
the transmitter configured to transmit the chirp signals with a cyclic prefix (CP).

12. The transmitter of claim 11, wherein the processor is further configured to generate a complementary sequence (CS) by linearly combining frequency responses of two constant-amplitude chirp signals.

13. The transmitter of claim 12, wherein transmitting the chirp signals comprises constructing, by the processor, at least one of a Golay complementary pair and a CS based on the shaped DFT of the information sequence.

14. The transmitter of claim 11, wherein transmitting/ number of chirp signals further comprises:

identifying $S=[\log_2((_l^M)\times H^l)]$ information bits, where H represents an integer power-of-two, and M represents a number of circularly-shifted chirp signals;
mapping l $\log_2$ of H of the identified information bits to $\{s_1, s_2, s_3, \ldots, s_l\}$, where $s_1, s_2, s_3, \ldots, s_l \in \mathcal{S}_{PSK,H}$;
utilizing the remaining information bits to choose a set of indices $\{m_1, m_2, m_3, \ldots, m_l\}$, where $m_1, m_2, m_3, \ldots, m_l \in \{0, 1, \ldots M-1\}$ and $m_1 < m_2 < m_3 < \ldots < m_l$;
generating modulation symbols as $d_{m_1}=s_1$, $d_{m_2}=s_2$, $d_{m_3}=s_3, \ldots, d_{m_l}=s_l$ and $d_{i|i\in\{0, 1, \ldots M-1\}i\neq m_1, m_2, m_3, \ldots, m_l}=0$;
increasing a spectral efficiency (SE) of the chirp signals as $\rho=([\log_2((_l^M)\times H^l)])/M$ bit/second/Hz; and
maintaining a peak-to-mean-envelope-power ratio (PMEPR) of the chirp signals to be less than or equal to 1.

15. The transmitter of claim 14, wherein l=2.

16. The transmitter of claim 11, wherein the processor is further configured to:
implement a low complexity maximum-likelihood (ML) detector by evaluating $C_{i,k}=\mathcal{R}\{d_i e^{-2\pi k/H}\}$ for i=0, 1, ... M−1 and k=0, 1, ... H; and
choose two different indices for i and the corresponding k's that maximize $C_{i,k}$.

17. The transmitter of claim 14, wherein utilizing the remaining information bits to choose the set {m, n}, further comprises:
constructing a bijection function from integers via a combinatorial number system of degree 2.

18. The transmitter of claim 14, wherein identifying $S=[\log_2((_2^M)\times H^2)]$ information bits includes using a random set of integers without changing the cardinality.

19. The transmitter of claim 11, wherein the FDSS may be chosen among Bessel functions or Fresnel integers.

20. The transmitter of claim 11, wherein the processor is further configured to perform multiple DFT-spread operations to increase the spectral efficiency (SE) of the chirp signals.

* * * * *